UNITED STATES PATENT OFFICE.

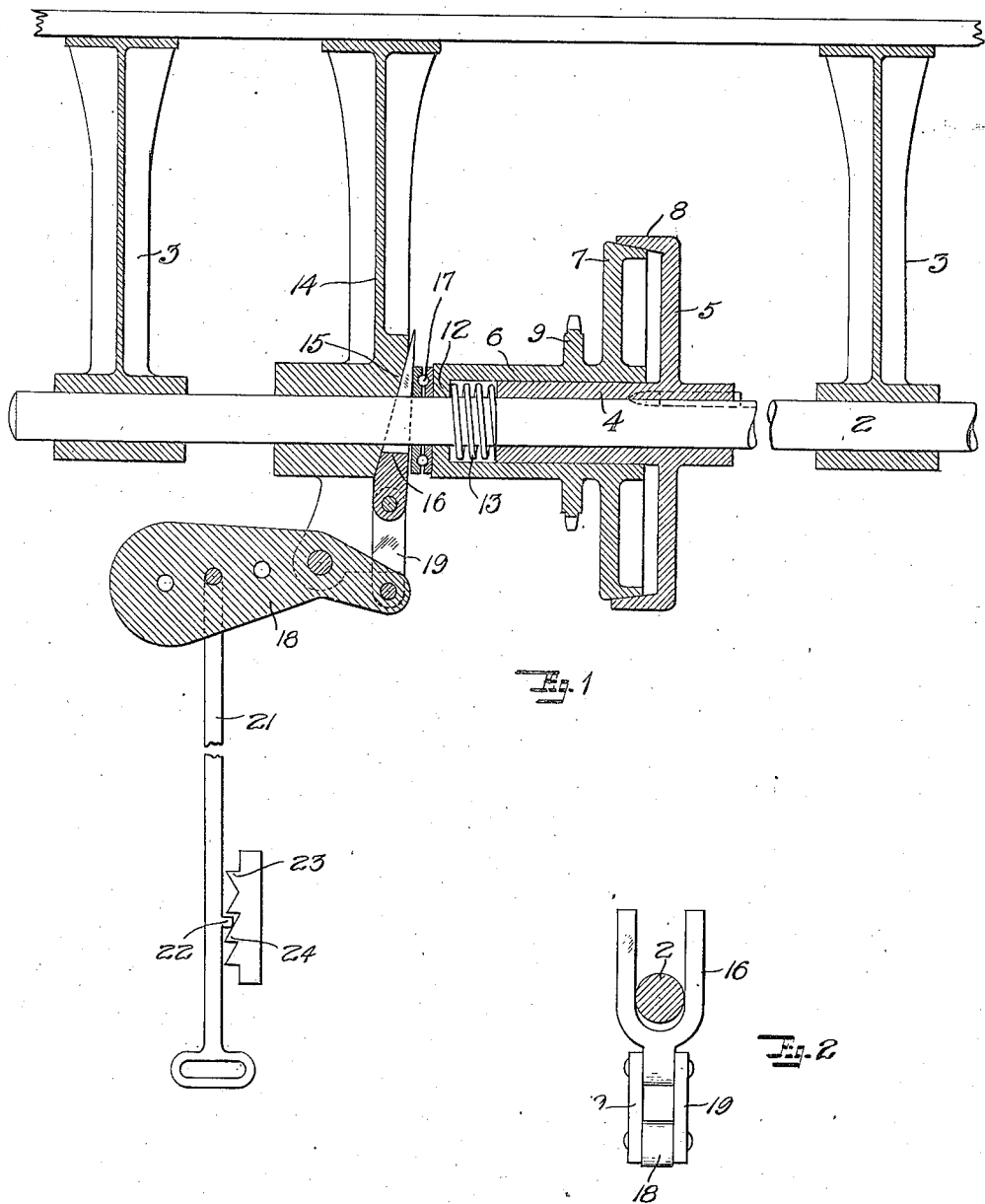

JOSEPH H. THERIEN, OF SAN FRANCISCO, CALIFORNIA, ASSIGNOR OF ONE-HALF TO L. CARRIE, OF SAN FRANCISCO, CALIFORNIA.

AUTOMATIC FRICTION-CLUTCH.

1,311,299.  Specification of Letters Patent.  Patented July 29, 1919.

Aplication filed July 9, 1917. Serial No. 179,401.

*To all whom it may concern:*

Be it known that I, JOSEPH H. THERIEN, a citizen of the United States, and a resident of the city and county of San Francisco and State of California, have invented a certain new and useful Automatic Friction-Clutch, of which the following is a specification.

The invention relates to power transmission devices and particularly to friction clutches for transmitting power from one shaft to another.

An object of the invention is to provide a clutch mechanism which gradually takes hold as the power to be transmitted decreases.

A further object of the invention is to provide a transmission device of the class described which is simple and cheap in construction and reliable in operation.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown only one specific form of my invention, but it is to be understood that the invention as expressed in the claims may be embodied in a plurality of forms.

Referring to said drawings:

Figure 1 is a vertical section of the transmission device of my invention.

Fig. 2 is an end view of the clutch-engaging wedge.

The apparatus of my invention is particularly useful in transferring power from a line shaft or other rotating element to a machine or other apparatus which is stopped and started at intervals, and particularly to machines or other apparatus possessing considerable inertia. It is undesirable to start such machines by directly connecting them to the line shaft, because the strains developed in starting are deleterious to the machines and connecting devices and frequently vary the speed of the line shaft. By the employment of the device of my invention the machine is gradually brought up to speed so that no deleterious strains are produced. The clutch of my invention will normally transmit a given amount of power and when the load is increased above that amount the clutch is partly disengaged to permit slippage.

In the drawing I have shown my invention in connection with a line shaft, but it is to be understood that it may be employed in connection with any driving shaft. The line shaft 2 is journaled in suitable hangers 3, secured to the ceiling or other convenient stationary structure. Secured to the shaft 2 is a sleeve 4, having the driving clutch member 5 formed integral therewith or secured thereto. Journaled on the sleeve 4 is the sleeve 6 having the driven clutch member 7 formed integral therewith or secured thereto. The driven clutch member 7 is preferably formed as a cone and the driving clutch member preferably has an annular conical flange 8 with which the cone frictionally engages. Secured to or formed integral with the sleeve 6 is a pulley, sheave or sprocket 9. The sleeve 6 extends beyond the end of sleeve 4 and is provided on its end with an inturned flange 12 and a spring 13 surrounding the shaft 2 is arranged between the sleeve 4 and the flange 12 to normally hold the driven and driving clutch members apart. The shaft 2 is stationary in a longitudinal direction.

Means are provided for moving the sleeve 6 longitudinally relatively to the sleeve 4, to bring the clutch members into frictional engagement. Arranged adjacent the flange 12 is a hanger 14 provided on the side adjacent the flange with an inclined face 15. Bearing against the inclined face and surrounding the shaft 2, is a U-shaped wedge 16 and between the wedge and the flange is a thrust bearing 17. The wedge is moved upwardly to press the clutch member 7 against the clutch member 5, by the weighted lever 18, pivoted to the hanger 14 and conected to the U-shaped wedge by the link 19. The weight forces the wedge upward, bringing the clutch members into tighter engagement.

Means are provided for holding the weight in the raised position so that the clutch members are out of engagement. Secured to the weight is a rod 21 having a projection 22 thereon which may be engaged with a fixed projection 23 to hold the weight in its elevated position. When it is desired to start the machine which is connected to the sprocket 9, the rod is released from the projection and the weight allowed to push the wedge upward gradually. The clutch gradually takes hold and the wedge is gradually raised until the clutch members are held frictionally together and the machine operates at its proper speed.

When it is desired to obtain an abrupt start of the machine or when the load is greater than the clutch, under the pressure of the weight, will carry, the rod may be pulled down and the projection 22 engaged under one of the fixed projections 24.

I claim:

1. In an apparatus of the character described, a driving friction clutch member, a driven friction clutch member, a spring tending to separate said members, an upwardly movable wedge arranged to move the members together and a weighted lever connected to the lower end of said wedge and adapted to move the wedge upward.

2. The combination with a driving shaft of a driving friction clutch member having a sleeve secured to said shaft, a driven friction clutch member having a hub journaled on said sleeve, means tending to separate said clutch members, a wedge arranged to move said clutch members into engagement and a weight attached to said wedge.

3. The combination with a driving shaft of a driving friction clutch member having a sleeve secured to said shaft, a driven friction clutch member having a hub journaled on said sleeve, means tending to separate said clutch members, a stationary bearing for said shaft, a thrust bearing surrounding the shaft and bearing against the end of the hub, a wedge arranged between said fixed bearing and thrust bearing and a weight attached to said wedge and arranged to force the wedge in between said bearings.

4. The combination with a driving shaft of a driving friction clutch member having a sleeve secured to said shaft, a driven friction clutch member having a hub journaled on said sleeve, means tending to separate said clutch members, a stationary bearing for said shaft, a thrust bearing surrounding the shaft and bearing against the end of the hub, a wedge arranged between said bearings and adapted to be moved upwardly to separate said bearings and a weighted lever pivoted to the fixed bearing and connected to the lower end of the wedge.

5. The combination with a driving shaft of a driving friction clutch member having a sleeve secured to said shaft, a driven friction clutch member having a hub journaled on said sleeve, means tending to separate said clutch members, a stationary bearing for said shaft having an inclined face on that side adjacent the clutch members, a thrust bearing surrounding the shaft between the end of the hub and the fixed bearing, a U-shaped wedge surrounding the shaft and engaging on one side said inclined face and on the other side said thrust bearing and a weight attached to the wedge and arranged to force the wedge upward between said bearings.

6. In an apparatus of the character described, a driving friction clutch member, a driven friction clutch member, a spring tending to separate said members, a weight arranged to press the members together and means for holding said weight in operative position.

7. In an apparatus of the character described, a driving friction clutch member, a driven friction clutch member, a spring tending to separate said members, a weight arranged to press the members together, a rod attached to said weight and means for holding the rod down.

In testimony whereof, I have hereunto set my hand at San Francisco, California, this 27th day of June, 1917.

JOSEPH H. THERIEN.

In presence of—
H. G. PROST.